United States Patent [19]

Wu et al.

[11] Patent Number: 5,526,223

[45] Date of Patent: Jun. 11, 1996

[54] ELECTRODE MATERIALS AND ELECTROCHEMICAL CAPACITORS USING SAME

[75] Inventors: Han Wu, Barrington; John E. Nerz, Howthron Woods, both of Ill.

[73] Assignee: Motorola, Inc., Schaumburg, Ill.

[21] Appl. No.: 347,939

[22] Filed: Dec. 1, 1994

[51] Int. Cl.$^6$ ................................................ H01G 1/005
[52] U.S. Cl. .................... 361/508; 361/516; 361/523; 361/528; 361/532; 429/218; 429/219; 429/221; 429/224; 429/225; 429/226; 429/228
[58] Field of Search ........................... 301/508, 528, 301/523, 532, 516; 429/218, 219, 225, 226, 228, 224, 221

[56] References Cited

U.S. PATENT DOCUMENTS 5,074,988  12/1991  Nyberg et al. .................... 204/418
5,392,191  2/1995  Thomas et al. ................... 361/508
5,429,893  7/1995  Thomas et al. ................... 429/218

FOREIGN PATENT DOCUMENTS 1196683  11/1985  Canada .................................. 319/73

*Primary Examiner*—Leo P. Picard
*Assistant Examiner*—Anthony Dinkins
*Attorney, Agent, or Firm*—Kenneth M. Massaroni

[57] ABSTRACT

An electrochemical capacitor device (10) including an anode (20) and a cathode (30) separated by a separator (40) and surrounded by an electrolyte (50). The anode (20) and cathode (30) is fabricated from a multi-valent, multiple oxidation state material. The material has a high, an intermediate, and a low oxidation state. In an initial condition, both the anode and cathode are in the intermediate oxidation state. During charging, one electrode will be oxidized to the higher states, while the other electrode will be reduced to the lower state. The processes are reversed during discharge.

11 Claims, 4 Drawing Sheets

10

5,526,223

ELECTRODE MATERIALS AND ELECTROCHEMICAL CAPACITORS USING SAME

TECHNICAL FIELD

This invention relates in general to the field of electrochemical capacitors and more particularly to materials for the electrodes of such devices.

BACKGROUND OF THE INVENTION

Electrochemical capacitors are a class of high-rate energy storage devices which use electrolytes and electrodes of various kinds in a system similar to that of conventional batteries. Electrochemical capacitors like batteries are essentially energy storage devices. However, unlike batteries, they rely on charge accumulation and/or charge transfer at the electrolyte/electrode interface to store energy. Charge storage in electrochemical capacitors is therefore substantially a surface phenomena since operating current is so high that only the surface of the electrode is employed. Conversely, charge storage in batteries is a bulk phenomena occurring within the bulk of the electrode material.

Electrochemical capacitors can generally be divided into one of two subcategories: double layer capacitors in which the interfacial capacitance at the electrode/electrolyte interface can be modeled as two parallel sheets of charge; and pseudocapacitor devices in which charge transferred between the electrolyte and the electrode occurs over a wide potential range, and is the result of primary, secondary, and tertiary oxidation/reduction reactions between the electrode and the electrolyte. These types of electrochemical capacitors are being developed for high pulse power applications.

Most of the known pseudocapacitor active materials are based on metallic elements such as platinum, iridium, ruthenium, or cobalt. These materials are generally quite expensive and pose a significant hurdle to the wide-spread commercialization of this technology. Moreover, the use of two electrodes fabricated of similar materials in a symmetric configuration and having redox potentials in a relatively narrow voltage range restricts the cell voltage and hence the deliverable energy density. That is, the voltage ranges are small and hence the commercial applicability of the device is limited. Other less expensive materials have been tried but have been less than successful. For example, workers in the field have attempted to fabricate devices using pressed powder cobalt and cobalt oxide electrodes. However, these types of electrodes have failed for numerous reasons including for example poor cycle life, and inability to achieve desired electrochemical performance characteristics.

Accordingly, there exists a need for an electrochemical capacitor electrode material which delivers good performance in terms of energy storage, power density and cycle life. Moreover, such material should be abundant in nature, readily processable into devices, and relatively benign environmentally.

DETAILED DESCRIPTION OF THE PREFERRED EMBODIMENT

Figure 1:
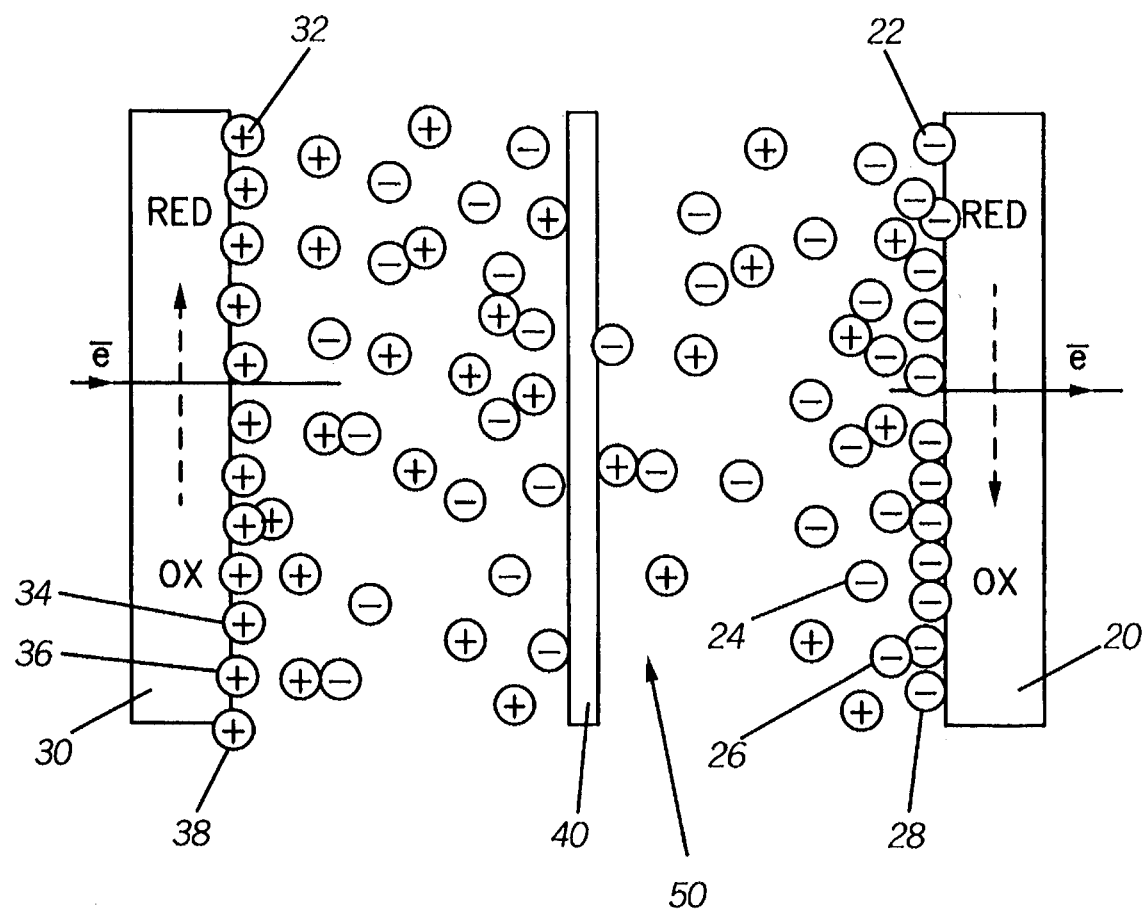
FIG. 1 is a schematic representation of a high energy density electrochemical capacitor in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a representation of a high-energy density electrochemical capacitor device (10) in accordance with the instant invention. The device (10) includes an anode (20), a cathode (30) and a separator (40) operatively disposed between the anode and the cathode. Also disposed between the anode and the cathode is an electrolyte (50), which is illustrated in FIG. 1 as an aqueous (liquid) electrolyte disposed entirely about both the anode (20) and the cathode (30). It is to be understood, however, that the instant invention is not limited to an aqueous/liquid electrolyte, but may also be employed advantageously to a non-aqueous or solid-state electrochemical device.

In one preferred embodiment of the instant invention, the anode (20) and the cathode (30) are both fabricated of a multiple oxidation state material such as that described in greater detail hereinbelow. The electrolyte (50) used in connection with the electrochemical capacitor device may be an aqueous electrolyte, such as an alkaline electrolyte, a neutral electrolyte, or an acidic electrolyte. In one preferred embodiment, the electrolyte is 30% KOH. Similarly, the separator (40) may be fabricated of a number of known separator materials as are practiced in the art. Specific examples of such separators include, but are not limited to, porous cellulose, porous silica, glass wool, glass fiber, polypropylene and combinations thereof.

The schematic representation of the capacitor device as shown in FIG. 1 is used to explain the redox processes occurring at the anode and the cathode. According to industry convention the cathode is defined as the positive electrode and the anode as the negative electrode during the discharge process. The roles are reversed during the charging process. Thus, references herein to the "cathode" refer to the electrode serving as the cathode during discharge. Similarly, references herein to the "anode" refer to the electrode serving as the anode during discharge.

The schematic representation of the electrochemical device shown in FIG. 1 is used to explain the redox processes occurring at the anode (20) and cathode (30) of the device during operation. During charging, electrons, for example (24, 26, 28) supplied from the external circuit are accepted by the active material from which the anode (20) is formed, and the active materials undergo a reduction process. The resulting charge imbalance, here an excess of negative charge, is balanced by the migration of positively charged ions (32, 34, 36, 38) from the electrolytes to cathode (30) as shown. While the reduction process occurs at the anode (20) a complimentary oxidation process takes place at the cathode, resulting in the ejection of at least one electron at the cathode surface to the external circuit. Both the electrode processes occur at or near the electrode/electrolyte interface. During this process, ions pass through the porous separator (40). This entire scenario is then reversed during the discharge process of the device illustrated.

In accordance with the instant invention there is provided an electrode material for use as one or both of the electrodes in the electrochemical device illustrated in FIG. 1. Hence, in one preferred embodiment both the anode and the cathode are fabricated of the same multi-valent, multiple oxidation state material. The multi-valent, multiple oxidation state material should preferably exist in at least three (3) stable oxidation states. For example the material should have a high oxidation state, an intermediate oxidation state, and a low oxidation state. In one preferred embodiment, both the electrodes (anode 20 and cathode 30) are fabricated from the same material, which is, in an initial condition (either charged or discharged), in the intermediate oxidation state. During charging one electrode goes to the high oxidation state and the other goes to the low oxidation state. During discharge, both electrodes return to the intermediate oxidation state. Silver provides a useful example as it exists in the Ag, $Ag^+$ and $Ag^{2+}$ oxidation states. Both the anode and cathode may then be fabricated of silver in the $Ag^+$ oxidation state. Thus, during charging, the anode is reduced from the $Ag^+$ oxidation state to Ag, while the cathode is oxidized from the $Ag^+$ state to the $Ag^{2+}$ state. During discharge, both the anode and cathode return to the $Ag^+$ oxidation state.

The oxidation states must be derivable electrochemically and they must be stable for the life of the individual operating cycle. Further, material selected having such multiple oxidations should have fast and reversible kinetics. Fast kinetics is essential for high power applications and reversibility guarantees long cycle life of the device. Although fast kinetics is an intrinsic property of the material, the power performance can be enhanced by employing thin layers of material as the electrodes to increase the surface area. A final characteristic of the multiple oxidation state material used to fabricate electrodes for the device illustrated in FIG. I is a large separation and reversible potentials between oxidation states. Large separations and the reversible potentials guarantee better energy performance.

The material from which the electrodes of an electrochemical capacitor in accordance with the invention may be fabricated is selected from the group consisting of: titanium, chromium, manganese, rhenium, iron, osmium, palladium, platinum, gold, silver, mercury, indium, thallium, tin, lead, bismuth, antimony, selenium, sulfur, tellurium, polonium, bromium, iodine, arsenic, cerium, praseodymium, samarium, europium, uranium, americium, berkelium, phosphorous, niobium, oxides of the same, sulfates of the same, sulfides of the same, carbonates of the same, alloys of the same, and combinations thereof.

EXAMPLES

Example I

An electrochemical device was fabricated using silver (in the form of silver (I) oxide) as the active material from which both electrodes were fabricated. As fabricated, little or no potential difference initially existed because both electrodes were composed of the same material. However, when an external potential difference is applied to the electrodes the electrode serving as the anode began to oxidize from the $Ag^+$ oxidation state to the $Ag^{2+}$ oxidation state. Concurrently, the cathode underwent a reduction reaction back to base silver metal. ($Ag^+$ back to Ag) During discharge, the reverse reactions take place until both electrodes react back to $Ag^+$. The reactions occurring on both electrodes are as follows:

(1) 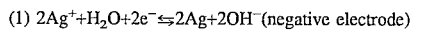 (negative electrode)

(2) 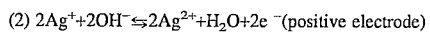 (positive electrode)

Figure 2:
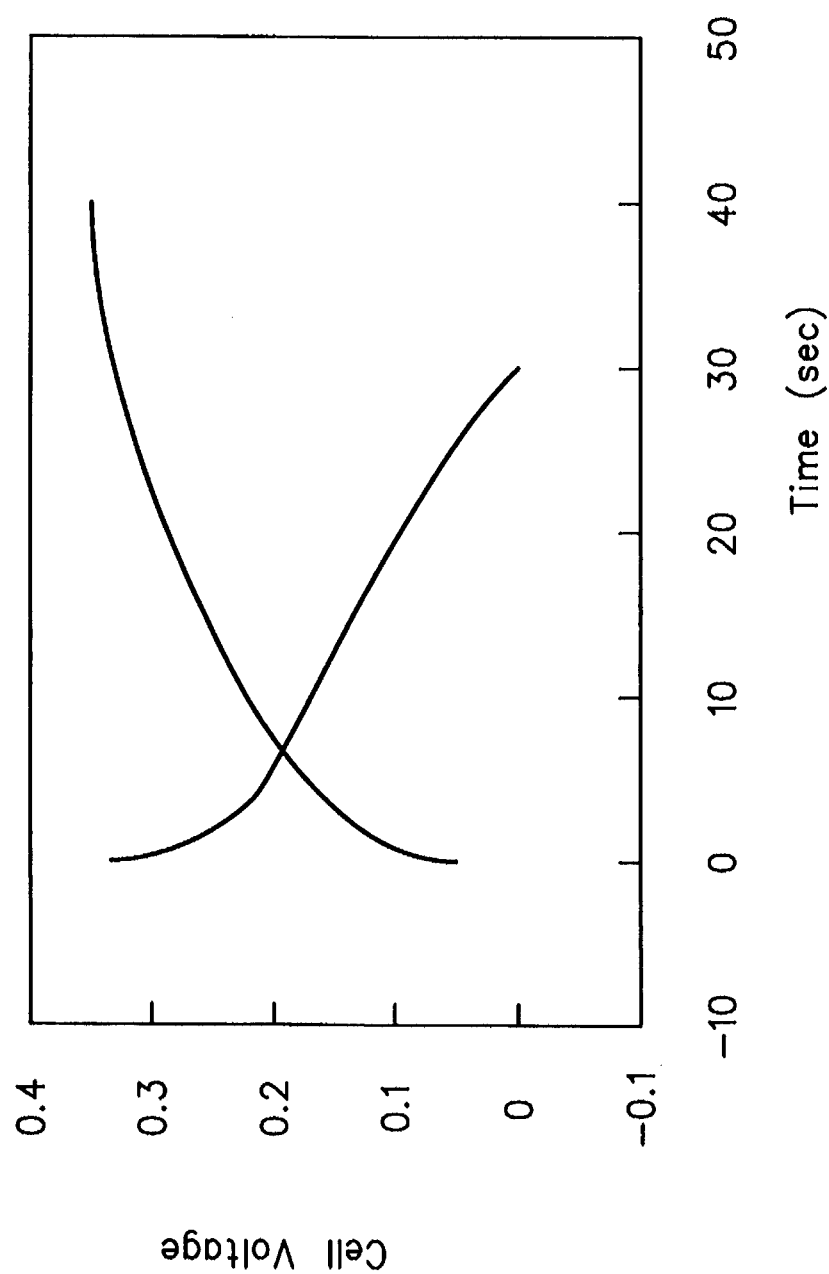
FIG. 2 is a chart illustrating constant current charging/discharging of a device fabricated in accordance with the instant invention.

The charge and discharge performance of such a device is illustrated in FIG. 2 under constant current charging/discharging operations. The device was built with two identical Teflon bonded silver (I) oxide-nickel mixed powder electrodes, each containing 60 mg $Ag_2O$, and 60 mg Nickel to aid current collection. Teflon bonded electrodes were fabricated by mixing the $Ag_2O$ powder and nickel powder with 5 wt % of Teflon binder. The resulting mixture, a cohesive body with a texture of clay, was passed through rollers to reduce the material to a desired thickness. The mixture was then dried under air for approximately 12 hours. A sample having the dimensions of 0.5 cm by 1° cm was then cut from the sample and pressed onto a nickel screen which was used as a current collector. The final weight of each electrode and current collector combination was about 0.18 g.

The electrodes were immersed in 31% KOH solution, and cycled at a constant current of 0.01 amps against one another without a third reference electrode. The resulting cell voltage is plotted in FIG. 2. FIG. 2 shows that within the operating voltage range of the device, 0–0.3 volts, the voltage response with respect to a constant current charge/discharge operation behaves as a capacitor. The cell voltage increased/decreased linearly as it charges/discharges respectively. Hence, multi-valent, multiple oxidation state materials may be advantageously used in electrochemical capacitor devices.

Figure 3:
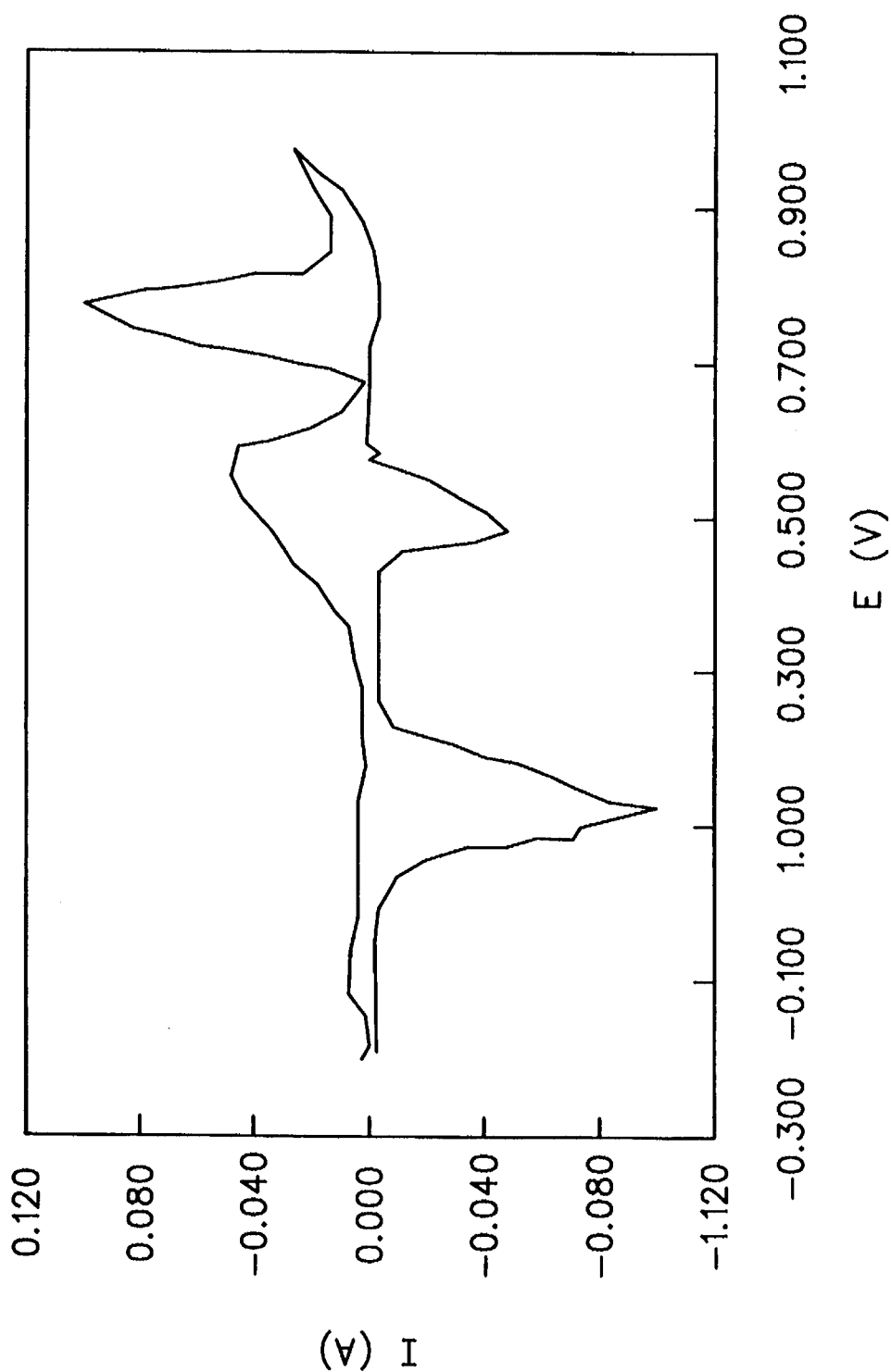
FIG. 3 is a cyclic voltammagram of an electrode fabricated of a multiple oxidation state material, in accordance with the instant invention.

Referring now to FIG. 3, there is illustrated therein a cyclic voltammagram demonstrating the performance characteristics of silver (I) oxide incorporated into an electrochemical capacitor device as described hereinabove. Unlike FIG. 2, where the voltage was measured as the potential difference between the two electrodes in the cell, the voltage in FIG. 3 was measured and controlled in terms of the potential differential between the silver (I) oxide and a mercury/mercury oxide reference electrode. The cyclic voltammagram illustrated in FIG. 3 illustrates the reactions between the multiple oxidation states of the active material. Thus, cyclic voltammary is a suitable technique for identifying candidate materials that can be used in electrochemical capacitor devices fabricated in accordance with the instant invention. The CV results illustrated in FIG. 3 demonstrate that silver (I) oxide possesses characteristics necessary to produce an acceptable electrochemical capacitor.

Figure 4:
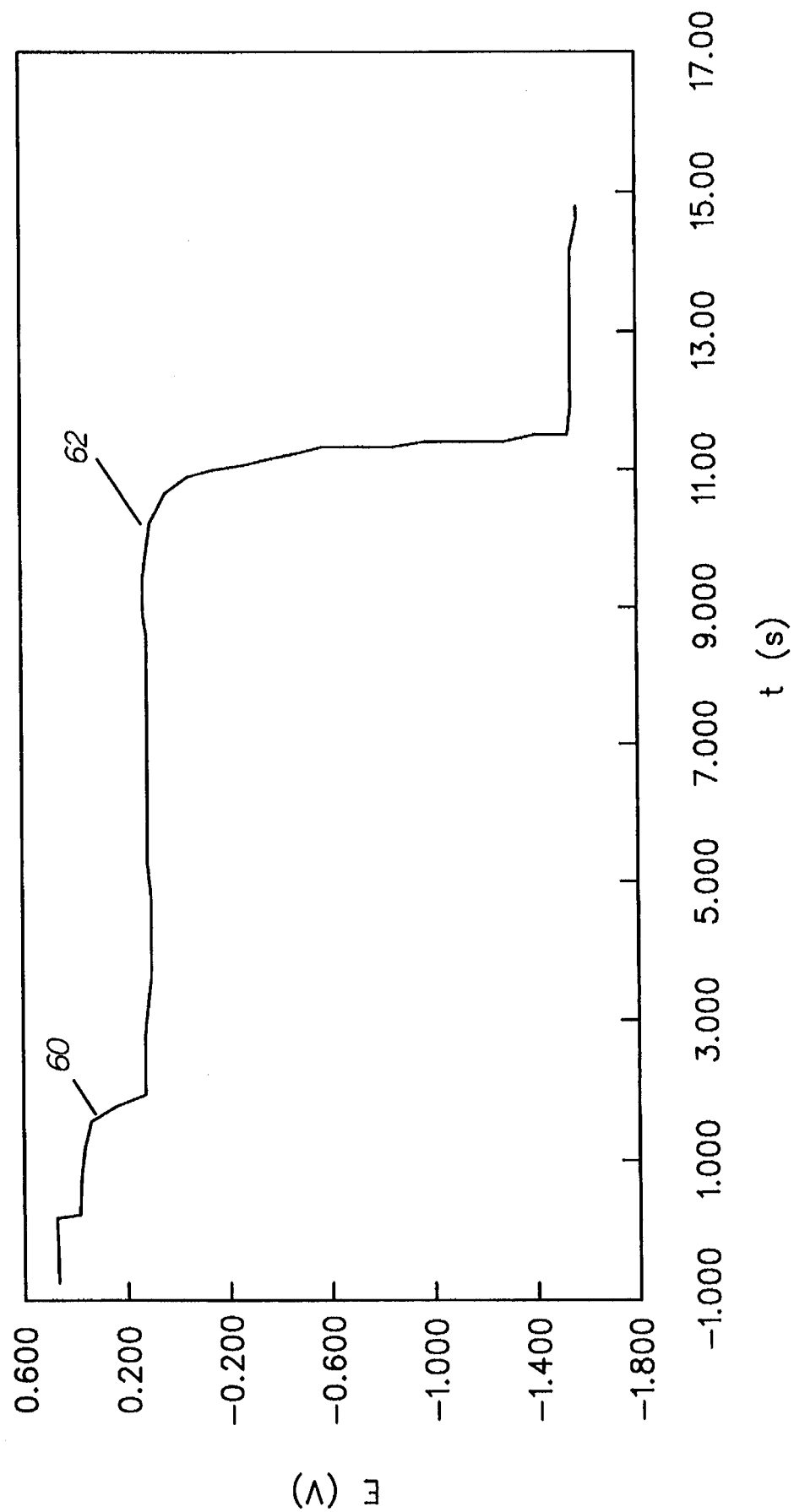
FIG. 4 is a chart illustrating the potential of an electrode fabricated in accordance with the instant invention, under constant current discharging.

Referring now to FIG. 4 there is illustrated therein a chart showing the potential of an electrode fabricated in accordance with the instant invention, under constant current discharging. FIG. 4 shows the potential change as the electrode fabricated in accordance with the instant invention was undergoing constant current discharge possesses. The reactions illustrated hereinabove in equations 1 and 2 are shown here as voltage steps occurring at approximately 0.4 volts (point 60) and 0.1 volts (point 62) respectively. As distinct oxidation states having relatively large separation between the potentials is a desirable feature of materials used in an electrochemical capacitor in accordance with the instant invention, the technique illustrated in FIG. 4, is useful in identifying candidate materials which may be advantageously employed herein. As maybe appreciated from a perusal of FIG. 4, silver (1) oxide satisfies the requirements of a material used in connection with the instant invention.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrode for use in an electrochemical capacitor device, said electrode fabricated of a multiple oxidation state material, having at least three electrochemically stable oxidation states.

2. An electrode as in claim 1, wherein said multiple oxidation state material is selected from the group of materials consisting of titanium, chromium, manganese, rhenium, iron, osmium, palladium, gold, silver, mercury, indium, thallium, tin, lead, bismuth, antimony, selenium, sulfur, tellurium, polonium, bromium, iodine, arsenic, cerium, praseodymium, samarium, europium, uranium, americium, berkelium, phosphorous, niobium, oxides of the same, sulfates of the same, sulfides of the same, carbonates of the same, alloys of the same, and combinations thereof.

3. An electrode as in claim 1, wherein said electrode is fabricated of silver.

4. An electrochemical capacitor device comprising:

at least a pair of electrodes, including at least one anode and one cathode, at least one of said electrodes being fabricated of a multiple oxidation state material selected from the group consisting of titanium, chromium, manganese, rhenium, iron, osmium, palladium, gold, silver, mercury, indium, thallium, tin, lead, bismuth, antimony, selenium, sulfur, tellurium, polonium, bromium, iodine, arsenic, cerium, praseodymium, samarium, europium, uranium, americium, berkelium, phosphorous, niobium, oxides of the same, alloys of the same, sulfides of the same, sulfides of the same, carbonates of the same and combinations thereof; and an ion-conducting electrolyte disposed between said electrodes.

5. An electrochemical capacitor device as in claim 4 wherein said at least one anode and one cathode are both fabricated of a multiple oxidation state material.

6. An electrochemical capacitor device as in claim 4, wherein said at least one electrode is fabricated of silver.

7. An electrochemical capacitor device having an anode, a cathode, and an electrolyte, said anode and said cathode fabricated of a material having a high oxidation state, an intermediate oxidation state, and a low oxidation state, and wherein said material is in said intermediate oxidation state in an initial condition.

8. An electrochemical capacitor device as in claim 7, wherein both said anode and said cathode are fabricated of the same material.

9. An electrochemical capacitor device as in claim 7, wherein said material is in said intermediate oxidation state when said device is in a discharged state.

10. An electrochemical capacitor device as in claim 7, wherein said material is in said intermediate oxidation state when said device is in a charged state.

11. An electrochemical capacitor device as in claim 7, wherein said material is selected from the group consisting of titanium, chromium, manganese, rhenium, iron, osmium, palladium, gold, silver, mercury, indium, thallium, tin, lead, bismuth, antimony, selenium, sulfur, tellurium, polonium, bromium, iodine, arsenic, cerium, praseodymium, samarium, europium, uranium, americium, berkelium, phosphorous, niobium, alloys of the same, sulfides of the same, sulfides of the same, carbonates of the same and combinations thereof.

* * * * *